United States Patent
Imagawa (10) Patent No.: US 8,514,287 B2
(45) Date of Patent: Aug. 20, 2013

(54) IMAGING MODULE HAVING STABILIZATION MECHANISM

(75) Inventor: Hiroaki Imagawa, Tokyo (JP)

(73) Assignee: Olympus Corporation, Tokyo (JP)

( * ) Notice: Subject to any disclaimer, the term of this patent is extended or adjusted under 35 U.S.C. 154(b) by 222 days.

(21) Appl. No.: 13/043,847

(22) Filed: Mar. 9, 2011

(65) Prior Publication Data

US 2011/0228111 A1  Sep. 22, 2011

(30) Foreign Application Priority Data

Mar. 19, 2010 (JP) .................................. 2010-064176

(51) Int. Cl.
 *H04N 5/228* (2006.01)
(52) U.S. Cl.
 USPC ........................................ 348/208.1; 348/374
(58) Field of Classification Search
 USPC ..................... 348/208.99, 208.11, 222.1, 374
 See application file for complete search history.

(56) References Cited

U.S. PATENT DOCUMENTS

| | | | |
|---|---|---|---|
| 7,519,282 B2 | 4/2009 | Shin et al. | |
| 7,912,362 B2 * | 3/2011 | Lim et al. | 348/208.11 |
| 2006/0017818 A1 * | 1/2006 | Enomoto | 348/219.1 |
| 2006/0077260 A1 | 4/2006 | Pyo et al. | |
| 2008/0198462 A1 * | 8/2008 | Sekino | 359/557 |
| 2009/0002503 A1 * | 1/2009 | Sekino et al. | 348/208.99 |
| 2010/0098394 A1 * | 4/2010 | Ishihara et al. | 396/55 |
| 2011/0097062 A1 * | 4/2011 | Tsuruta et al. | 396/55 |

FOREIGN PATENT DOCUMENTS

| | | |
|---|---|---|
| JP | 2006-113545 A | 4/2006 |
| JP | 2006-295553 A | 10/2006 |
| JP | 2006-330678 A | 12/2006 |

* cited by examiner

*Primary Examiner* — Gevell Selby
(74) *Attorney, Agent, or Firm* — Holtz, Holtz, Goodman & Chick, P.C.

(57) ABSTRACT

An imaging module is provided with an image pickup device unit having an image pickup device; an optical unit to form a subject image on the image pickup device; and an image stabilization mechanism having a first drive unit to move an image stabilization object element that is at least one of the image pickup device and the optical unit in a first direction that is parallel with an imaging area of the image pickup device, and a second drive unit to move the image stabilization object element in a second direction that is parallel with the imaging area and intersects with the first direction, wherein the imaging module has a rectangular shape on a plane that is parallel with the imaging area, and the first drive unit and the second drive unit are respectively arranged around the optical unit and at two neighboring sides of the imaging module.

6 Claims, 14 Drawing Sheets

IMAGING MODULE HAVING STABILIZATION MECHANISM

CROSS-REFERENCE TO RELATED APPLICATIONS

This application claims benefit of Japanese Application No. 2010-064176 filed Mar. 19, 2010, the contents of which are incorporated by this reference.

BACKGROUND OF THE INVENTION

1. Field of the Invention

The present invention relates to an imaging module provided with an image stabilization mechanism.

2. Description of the Related Art

Conventionally, mobile phones are provided with cameras, and most of those cameras are fixed focal length cameras. DSCs (Digital Still Cameras) have a high magnification, and in particular require image stabilization. On the other hand, fixed focal length cameras are less susceptible to camera shaking.

However, photographs are typically taken with one hand when a mobile phone camera is used. As a result, the amount of camera shaking is far larger than that of DSCs, with which photographs are taken using both hands. Accordingly, the need for image stabilization for mobile phones is intensifying.

In DSCs in particular, the image stabilization mechanism has a large footprint and a relatively large thickness. On the other hand, in mobile phones or small DSCs in particular, downsizing of the image stabilization mechanism or even downsizing of an imaging module is desired, and various types of image stabilization mechanisms have been proposed (for example, see Patent Documents 1-3: Patent Document 1 (Japanese Laid-open Patent Publication No. 2006-113545); Patent Document 2 (Japanese Laid-open Patent Publication No. 2006-330678); and Patent Document 3 (Japanese Laid-open Patent Publication No. 2006-295553)).

The image stabilization mechanism used for imaging devices includes the image stabilization performed by moving an image pickup device or an optical system in an X-direction and a Y-direction that are parallel with the imaging area.

For example, in the image stabilization mechanism according to Patent Documents 1 and 2, a drive unit for moving an image pickup device as an image stabilization object element is arranged under an optical system.

In particular, in the image stabilization mechanism according to Patent Document 1, the footprint is large, and the above-mentioned drive unit is arranged in a large space around the image pickup device.

In the image stabilization mechanism according to Patent Document 2, the above-mentioned drive unit is arranged further under the image pickup device, and has a great thickness.

SUMMARY OF THE INVENTION

An imaging module according to the present invention is provided with an image pickup device unit having an image pickup device, an optical unit to form a subject image on the image pickup device, and an image stabilization mechanism having a first drive unit to move an image stabilization object element that is at least one of the image pickup device and the optical unit in a first direction that is parallel with an imaging area of the image pickup device, and a second drive unit to move the image stabilization object element in a second direction that is parallel with the imaging area and intersects with the first direction, where the imaging module has a rectangular shape on a plane that is parallel with the imaging area, and the first drive unit and the second drive unit are respectively arranged around the optical unit and to at two neighboring sides of the imaging module.

DESCRIPTION OF THE PREFERRED EMBODIMENTS

Figure 1:
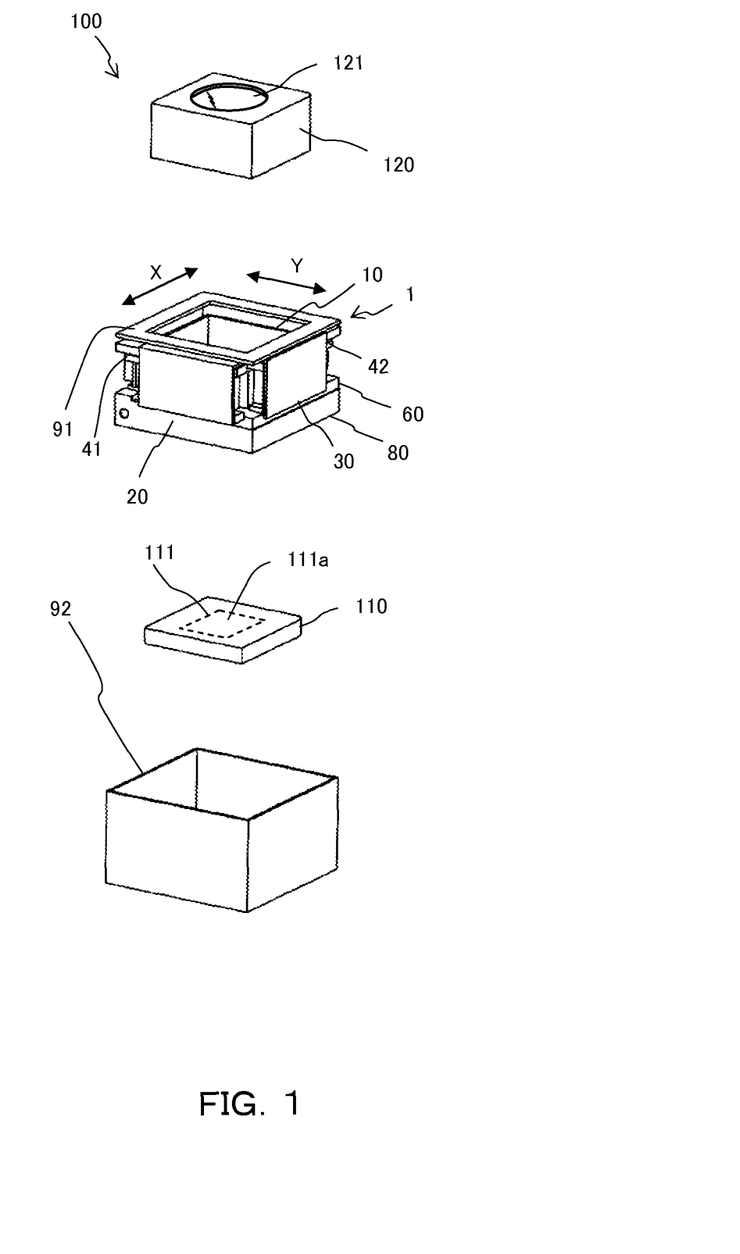
FIG. 1 is an exploded perspective view of an imaging module from the upper left according to an embodiment of the present invention.
Figure 2:
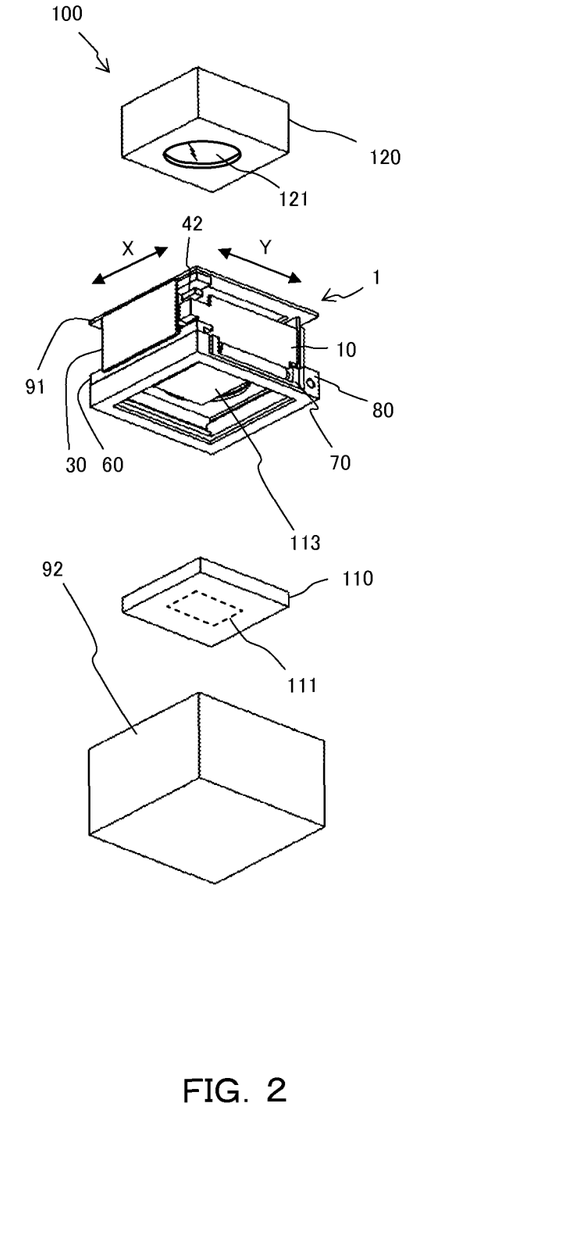
FIG. 2 is an exploded perspective view of an imaging module from the lower right according to an embodiment of the present invention.

An imaging module according to an embodiment of the present invention will be described below with reference to the accompanying drawings. FIGS. 1 and 2 are exploded perspective views of an imaging module 100 according to an embodiment of the present invention from the upper left and lower right, respectively.

Figure 3:
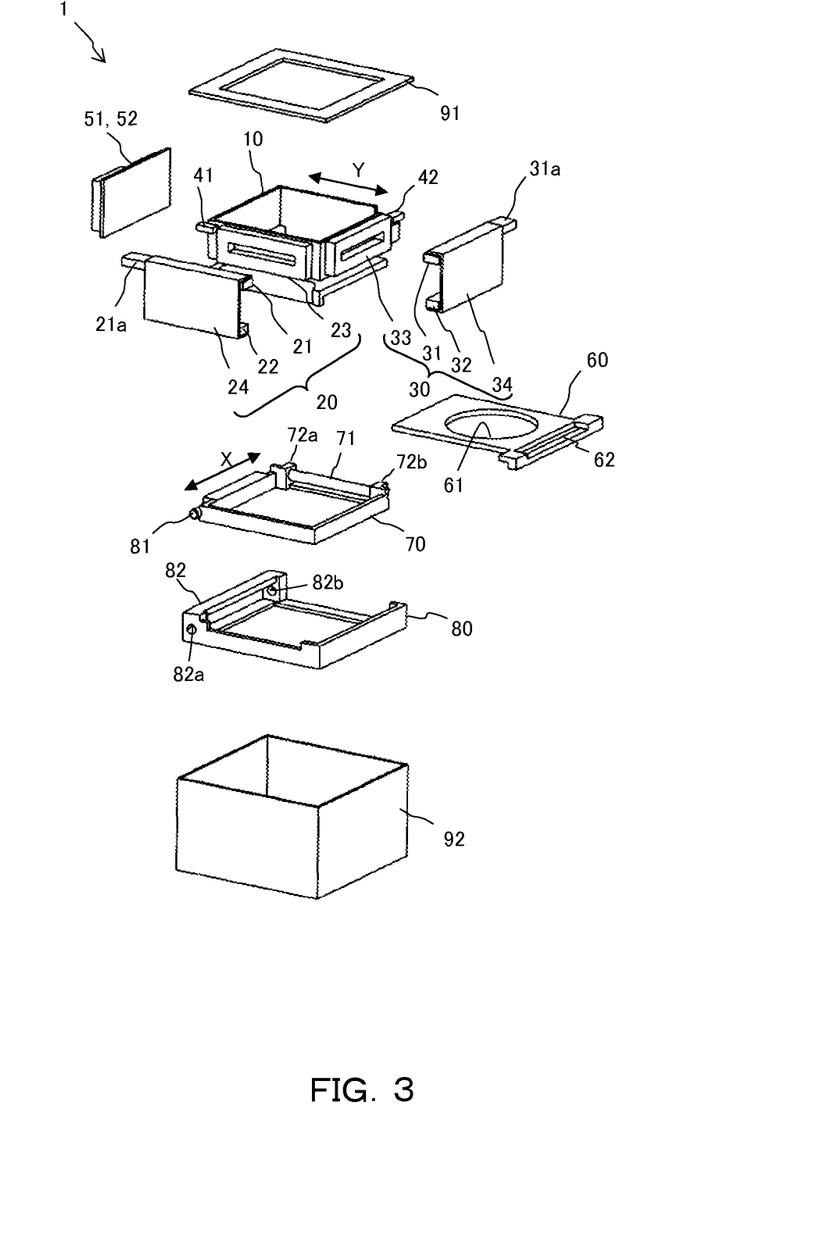
FIG. 3 is an exploded perspective view of an image stabilization mechanism of an imaging module from the upper left according to an embodiment of the present invention.

FIG. 3 is an exploded perspective view of an image stabilization mechanism 1 of the imaging module 100 from the upper left.

Figure 4:
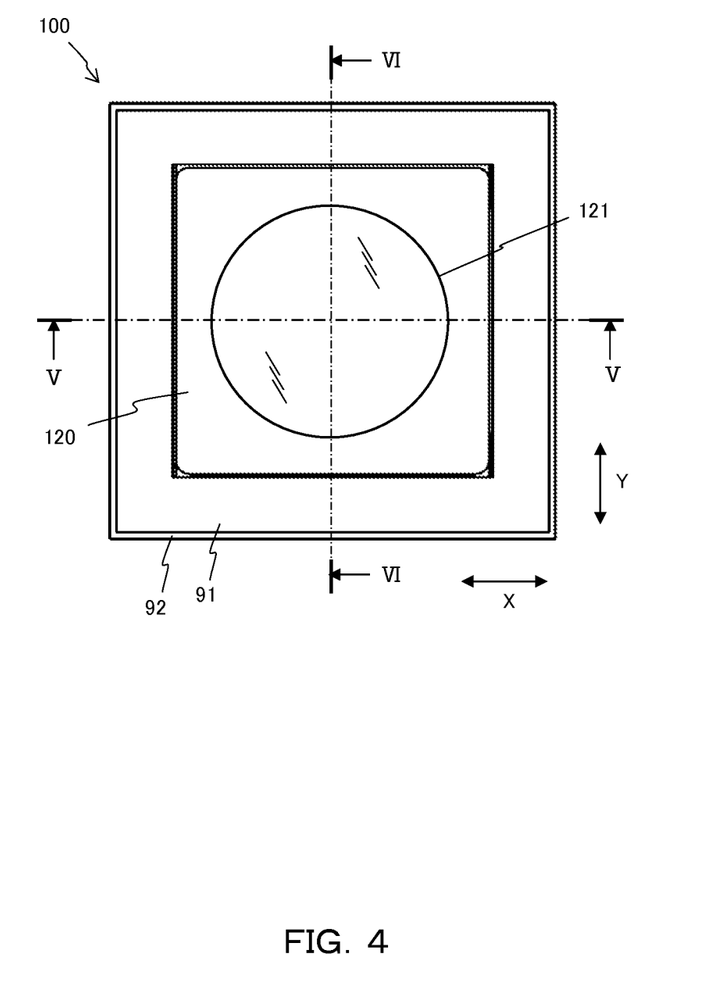
FIG. 4 is a plan view of an imaging module according to an embodiment of the present invention.

FIG. 4 is a plan view of the imaging module 100.

Figure 5:
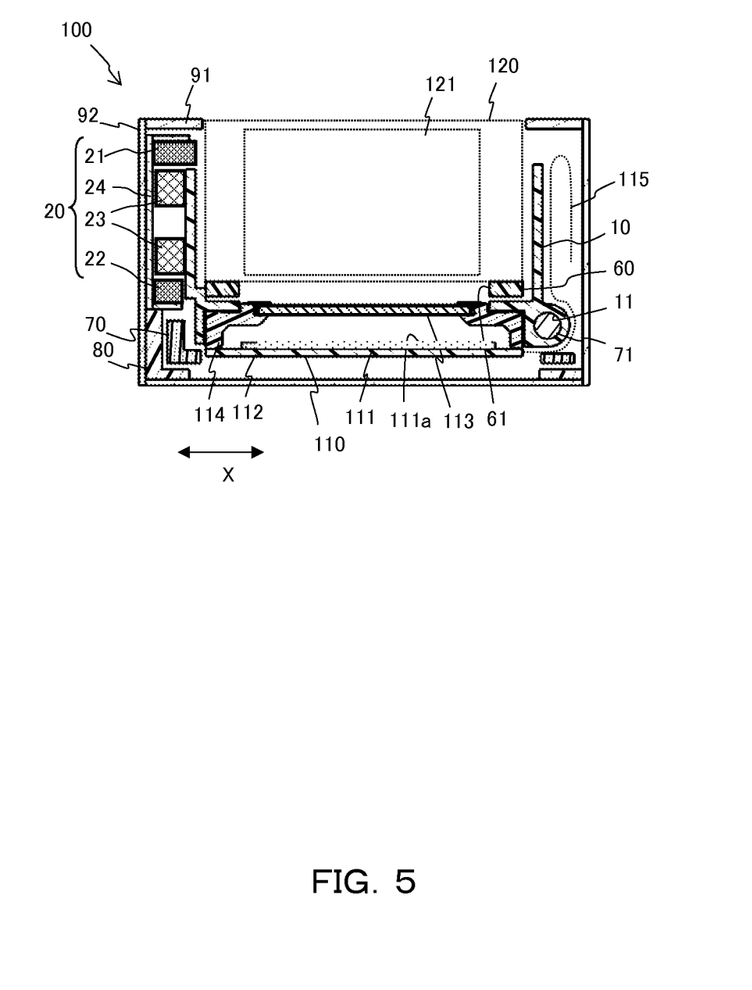
FIG. 5 is a section view of V-V of FIG. 4.
Figure 6:
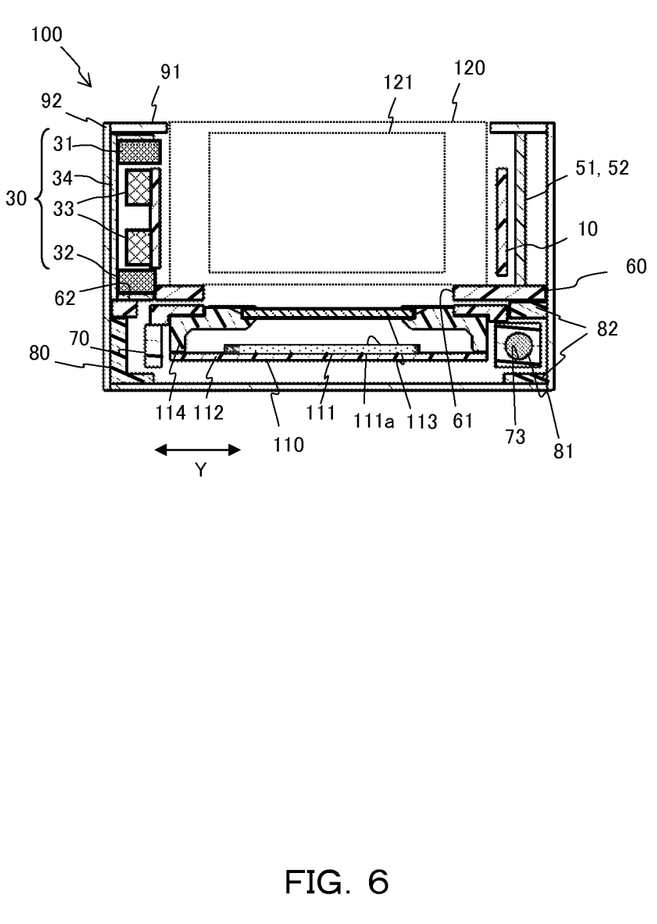
FIG. 6 is a section view of VI-VI of FIG. 4.

FIGS. 5 and 6 are section views of V-V and VI-VI of FIG. 4, respectively.

Figure 7:
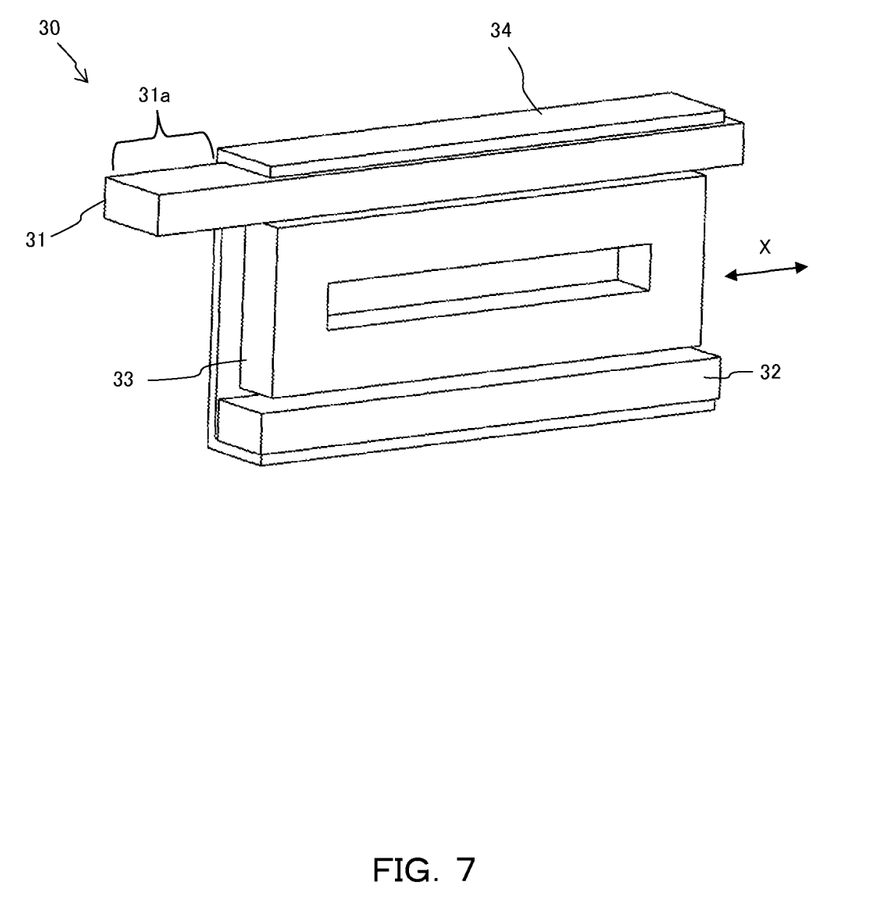
FIG. 7 is a perspective view of a Y-direction drive unit of an imaging module from the back side according to an embodiment of the present invention.
Figure 8:
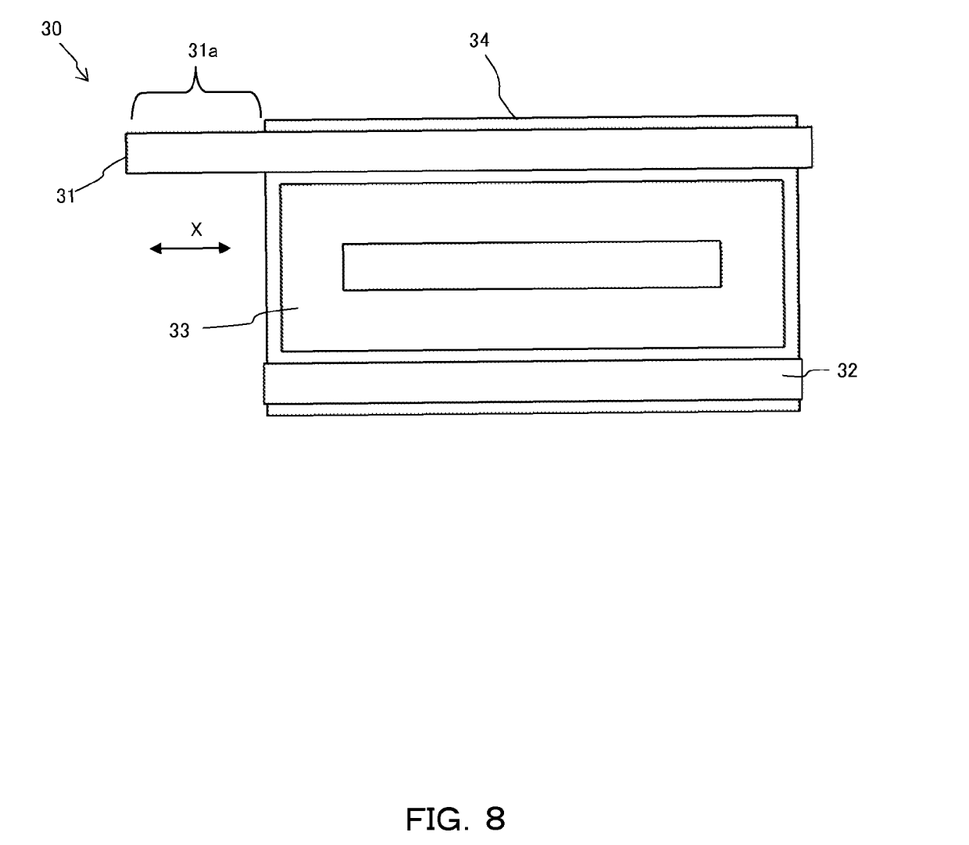
FIG. 8 is a rear view of a Y-direction drive unit of an imaging module according to an embodiment of the present invention.
Figure 9:
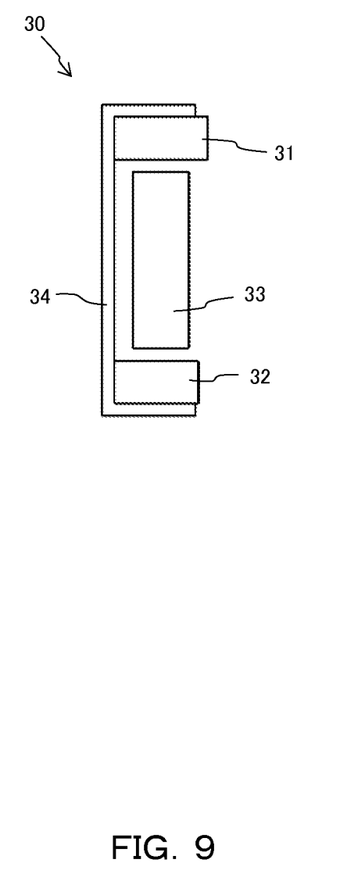
FIG. 9 is a right-side view of a Y-direction drive unit of an imaging module according to an embodiment of the present invention.

FIGS. 7-9 are a perspective view of a Y-direction drive unit 30 of the imaging module 100 from the back side, and a rear view and a right-side view of the Y-direction drive unit 30 of the imaging module 100, respectively.

Figure 10:
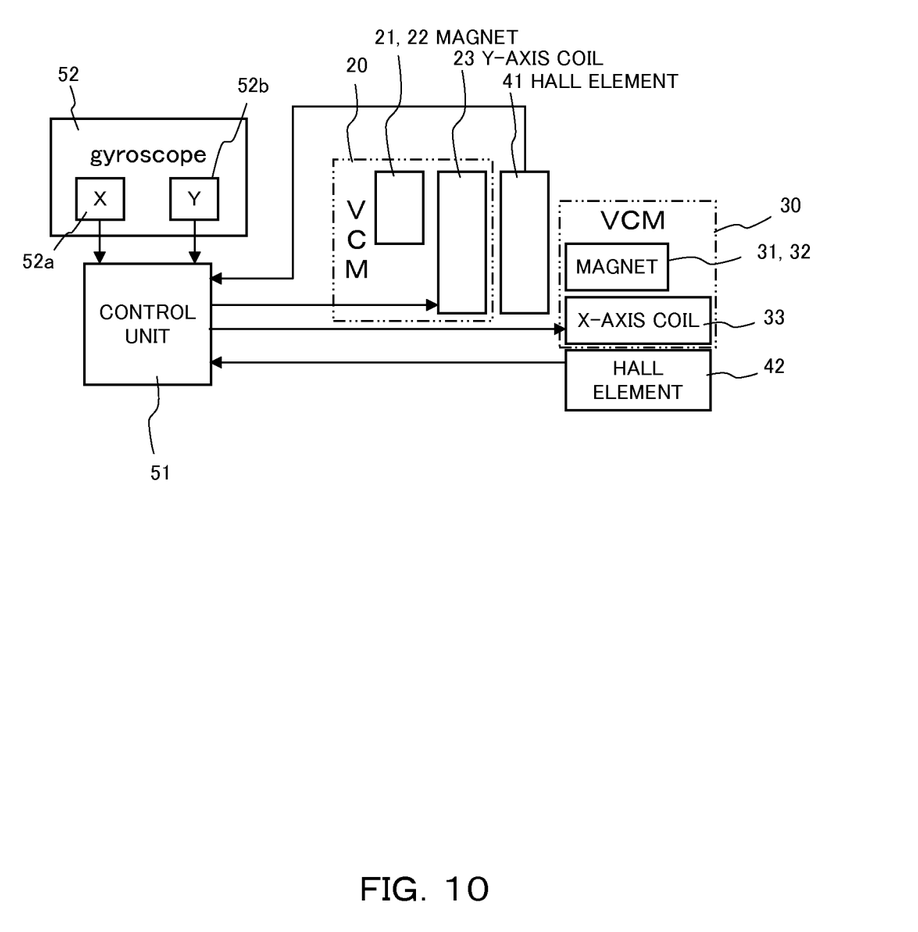
FIG. 10 is a block diagram explaining the control structure of an imaging module according to an embodiment of the present invention.

FIG. 10 is a block diagram explaining the control structure of the imaging module 100.

As illustrated in FIGS. 1 and 2, the imaging module 100 is provided with an image stabilization mechanism 1, an image pickup device unit 110 having an image pickup device 111 as an image stabilization object element, and an optical unit 120 that forms a subject image on the image pickup device 111. The imaging module 100 is used, for example, for a mobile phone or a small-sized DSC.

As illustrated in FIG. 3, the image stabilization mechanism 1 is provided with a Y-direction slider 10 as a first movable unit, an X-direction drive unit 20 that is a voice coil motor (VCM) as a first drive unit, a Y-direction drive unit 30 that is a voice coil motor (VCM) as a second drive unit, hall elements 41 and 42, a control unit 51, a gyroscope 52 as a camera shaking detection sensor, a holder 60, an X-direction slider 70 as a second movable unit, a base unit 80, and a top cover 91 and a bottom cover 92 that form the cabinet of the image stabilization mechanism 1 and the imaging module 100.

The Y-direction slider 10 has a rectangular-shaped frame that is open on the top face and bottom face. Moreover, an optical unit 120 that has a square shape in a planar view, which will be described later, is disposed in the Y-direction slider 10, and thus the Y-direction slider 10 has an approximately square shape in a planar view.

As illustrated in FIGS. 5 and 6, under the Y-direction slider 10, the image pickup device unit 110 is fixed to a cover glass holder 114 by, for example, adhesion. Note that the position at which the image pickup device unit 110 is fixed is not limited to the upper surface of the cover glass holder 114, but the image pickup device unit 110 may be fixed to the rim of the cover glass holder 114. As described above, the Y-direction slider 10 is indirectly provided with the image pickup device 111, and thus it is possible for the image pickup device 111 to move with the Y-direction slider 10 in an integrated manner.

The Y-direction slider 10 is moved by the Y-direction drive unit 30 in the Y-direction (i.e., "first direction", which is parallel with an imaging area 111a of the image pickup device 111). In particular, the Y-direction slider 10 is penetrated by a Y-direction guide axis 71 of the X-direction slider 70 at a through-hole 11 as illustrated in FIG. 5, and the Y-direction slider 10 slides along this Y-direction guide axis 71 in the Y-direction.

Moreover, the Y-direction slider 10 is also moved by the X-direction drive unit 20 in the X-direction (i.e., "second direction", which is parallel with the imaging area 111a of the image pickup device 111 and that intersects with the above-mentioned first direction) together with the X-direction slider 70, as will be described later in detail. In other words, the image pickup device 111 moves in both the Y-direction and X-direction with the Y-direction slider in an integrated manner.

As illustrated in FIGS. 3 and 5, the X-direction drive unit 20 is provided with magnets 21 and 22, a coil 23, and a yoke 24. Moreover, as illustrated in FIG. 3 and FIGS. 6-9, the Y-direction drive unit 30 is provided with magnets 31 and 32, a coil 33, and a yoke 34 in a similar manner as the X-direction drive unit 20.

The X-direction drive unit 20 and the Y-direction drive unit 30 are arranged around an optical unit 120. Moreover, the X-direction drive unit 20 and the Y-direction drive unit 30 are respectively arranged at two neighboring sides of a plane of the imaging module 100, which is parallel with the imaging area 111a and has a rectangle shape.

As illustrated in FIGS. 3 and 5, the magnets 21 and 22 of the X-direction drive unit 20 are long in the Y-direction, and are opposite to the coil 23 in the height direction (i.e., the optical-axis direction of the optical unit 120), which intersects with the imaging area 111a of the image pickup device 111. Furthermore, the magnets 21 and 22 are opposite to each other across the coil 23 in the height direction.

In a similar manner, as illustrated in FIG. 4 and FIGS. 6-9, the magnets 31 and 32 of the Y-direction drive unit 30 are long in the X-direction, and are opposite to the coil 33 in the height direction, which intersects with the imaging area 111a of the image pickup device 111. Furthermore, the magnets 31 and 32 are opposite to each other across the coil 33 in the height direction.

The yoke 24 of the X-direction drive unit 20 surrounds the magnets 21 and 22 as well as the coil 23, and has a quadrangular-shaped section that is open on the side of the optical unit 120. In a similar manner, the yoke 34 of the Y-direction drive unit 30 surrounds the magnets 31 and 32 as well as the coil 33, and has a quadrangular-shaped section that is open on the side of the optical unit 120. The yokes 24 and 34 are formed, for example, by bending a metal plate.

The shape of the sections of the yokes 24 and 34 is not limited to a quadrangular shape in which one side is open, but may have, for example, an L-shaped section that is open on the top face or the bottom face in addition to the side of the optical unit 120, or an I-shaped section that is open on the side of the optical unit 120 as well as the top face and the bottom face. In other words, the yokes 24 and 34 may be composed of a plate that is positioned on the opposite side of the optical unit 120.

The coils 23 and 33 are fixed to the outer surface of the Y-direction slider 10. As illustrated in FIG. 5, the magnets 21 and 22 and the yoke 24 of the X-direction drive unit 20 are fixed to the top face of the base unit 80 at the bottom face of the yoke 24. On the other hand, as illustrated in FIG. 6, the magnets 31 and 32 and the yoke 34 of the Y-direction drive unit 30 are fixed to a concave portion 62 that is formed on the top face of a holder 60 at the bottom face of the yoke 24. Note that the X-direction drive unit 20 and Y-direction drive unit 30 may be fixed to an inner surface of a bottom cover 92.

The magnets 21 and 31 positioned above the X-direction drive unit 20 and Y-direction drive unit 30 are longer than the magnets 22 and 32 positioned below, and have protruding portions 21a and 31a that protrude from the portion surrounded by the yoke 24. Note that it is not always necessary for the magnets 21 and 31 to protrude from the yoke 24, but the magnets 21 and 31 may be surrounded by the yoke 24.

Under the protruding portions 21a and 31a, hall elements 41 and 42 are arranged so as to be opposite to these protruding portions 21a and 31a. As will be described later in detail, the hall elements 41 and 42 detect the magnetic field intensity and thereby detect the amount of movement of the image pickup device 111 in the X-direction and the Y-direction. Note that the hall elements 41 and 42 are fixed to an outer surface of the Y-direction slider 10.

As illustrated in FIG. 5, a flexible substrate 115 of the image pickup device unit 110 is dragged into the space around the optical unit 120 opposite to the X-direction drive unit 20 across the optical unit 120. The flexible substrate 115 is connected to, for example, a control unit 51.

As illustrated in FIG. 6, a control unit 51 and a gyroscope 52 are arranged around the optical unit 120 and are arranged so as to be opposite to the Y-direction drive unit 30 across the optical unit 120. Note that the control unit 51 and the gyroscope 52 are arranged on, for example, the same substrate held between the top cover 91 and the holder 60. The control of the X-direction drive unit 20, the Y-direction drive unit 30, or the like by the control unit 51 will be described later in detail.

As illustrated in FIGS. 5 and 6, the optical unit 120 is fixed to the top face of the holder 60 by, for example, adhesion. The holder 60 is fixed to the top surface of the base unit 80 at, for example, its bottom face. Note that the holder 60 has an approximately rectangular shape in a planar view, and has a through-hole 61 formed in the height direction. This through-hole 61 is formed in a circular shape in a planar view in a similar manner as the lens (optical element) 121 of the optical unit 120. A light beam that passes through the lens 121 goes through this through-hole 61, but it is not always necessary for the through-hole 61 to have a circular shape. Alternatively, the through-hole 61 may have a rectangular shape or a shape in which a circular shape and a rectangular shape are combined.

As illustrated in FIG. 3, the X-direction slider 70 has a rectangular-shaped frame that is open on the top face and the bottom face. Guide supporting units 72a and 72b that support the above-mentioned Y-direction guide axis 71 are provided for the X-direction slider 70. Note that the Y-direction guide axis 71 is arranged around the image pickup device unit 110.

The magnets 21 and 22 and the coil 23 of the X-direction drive unit 20 move X-direction slider 70 together with the Y-direction slider 10 in the X-direction with reference to the base unit 80. In particular, as illustrated in FIG. 6, the X-direction slider 70 has a through-hole 73 that an X-direction guide axis 81 of the base unit 80 penetrates. Further, the X-direction slider 70 slides into the through-hole 73 along the X-direction guide axis 81 in the X-direction.

Note that due to the configuration in which the X-direction slider 70 has a rectangular-shaped frame, the intensity of the X-direction slider 70 for movement in the Y-direction and X-direction can be secured even if the X-direction slider 70 is provided with not only the Y-direction guide axis 71 but also the through-hole 73 that the X-direction guide axis 81 penetrates.

The base unit 80 is provided with the above-mentioned X-direction guide axis 81 and a guide supporting unit 82 on which through-holes 82a and 82b are formed. Note that the X-direction guide axis 81 is fit to and inserted into the through-holes 82a and 82b. The X-direction guide axis 81 is also arranged around the image pickup device unit 110, in a similar manner as the Y-direction guide axis 71.

As illustrated in FIGS. 1-3, the bottom cover 92 has a rectangular parallelepiped box shape, and is open on the top face. As illustrated in FIGS. 5 and 6, the top cover 91 is arranged so as to fit into, for example, the top end of the inner surface of the bottom cover 92.

As illustrated in FIGS. 5 and 6, the image pickup device unit 110 is provided with the image pickup device 111, a base substrate 112 on which this image pickup device 111 is mounted, a cover glass 113 as a light transmissive cover, a cover glass holder 114 that holds this cover glass 113, and the above-mentioned flexible substrate 115.

The optical unit 120 is provided with a lens 121 that forms a subject image on the image pickup device 111, and an autofocus actuator (not illustrated) such as a voice coil motor that holds the lens 121 by sandwiching the lens 121 with an elastic body. Note that the optical unit 120 has a square shape in a planar view in a similar manner as the imaging module 100, and the center position in a planar view is the same as the center position of the imaging module 100. Furthermore, the optical axis of the lens 121 also coincides with the center position of the imaging module 100.

The image pickup device unit 110 and the optical unit 120 are respectively fixed to the image stabilization mechanism 1 from the opposite sides in the height direction (i.e., the direction intersecting with the imaging area 111a). More specifically, the image pickup device unit 110 is fixed to the bottom face of the Y-direction slider 10, and the optical unit 120 is fixed to the top face of the holder 60. Note that the position to which the image pickup device unit 110 is fixed is not limited to the bottom face of the Y-direction slider 10. The position to which the optical unit 120 is fixed is also not limited to the top face of the holder 60.

As illustrated in FIG. 10, the above-mentioned control unit 51 detects the amount of camera shaking (angular velocity) of an imaging device (not illustrated) by an X-direction detection unit 52a and a Y-direction detection unit 52b of the gyroscope 52. The control unit 51 calculates the detected amount of camera shaking as the amount of movement of the image pickup device 111, and feeds electric current to the coils 23 and 33 of the X-direction drive unit 20 and Y-direction drive unit 30 according to the amount of movement. Accordingly, the Y-direction slider 10 moves along the Y-direction guide axis 71 in the Y-direction, and the Y-direction slider 10 and the X-direction slider 70 move along the X-direction guide axis 81 in the X-direction, as described above. Accordingly, the image pickup device 111 of the image pickup device unit 110 provided to the Y-direction slider 10 moves in the Y-direction and the X-direction.

The hall elements 41 and 42 are arranged so as to be opposite to the protruding portions 21a and 31a of the magnets 21 and 31 as described above, and the hall elements 41 and 42 detect the amount of movement of the image pickup device 111 in the X-direction and the Y-direction by detecting the magnetic field intensity.

As long as the amount of movement of the image pickup device 111 detected by the hall elements 41 and 42 does not match the calculated amount of movement, the control unit 51 repeats the operation of feeding electric current to the coils 23 and 33 of the X-direction drive unit 20 and Y-direction drive unit 30 to move the image pickup device 111 and the operation of detecting the amount of movement of the image pickup device 111 using the hall elements 41 and 42.

Note that the X-direction drive unit (first drive unit) 20 and the Y-direction drive unit (second drive unit) 30 are not limited to the magnetism generating units (voice coil motors) that use magnets 21, 22, 31, and 32 and coils 23 and 33, and may be piezoelectric elements or other types of drive units. Nevertheless, it is still desirable to use magnetism generating units.

In the above-described present embodiment, the X-direction drive unit 20 and the Y-direction drive unit 30 are respectively arranged around the optical unit 120 and are respectively arranged at two neighboring sides of the imaging module 100. That is, according to the present embodiment, downsizing is achieved of the imaging module 100 with which the image stabilization mechanism 1 is provided and which moves the image stabilization object element (image pickup device 111) in two directions (Y-direction and X-direction) that are parallel with the imaging area 111a and intersect with each other.

Moreover, in the present embodiment, both (or at least one of) the gyroscope 52 and the control unit 51 are arranged around the optical unit 120 and are arranged so as to be opposite to the Y-direction drive unit 30 across the optical unit 120. Accordingly, even if the center of the imaging module 100 in a planar view is matched with or is close to the optical axis of the lens 121, downsizing of the imaging module 100 may be achieved by utilizing the space within the imaging module 100.

Moreover, in the present embodiment, the flexible substrate 115 of the image pickup device unit 110 is dragged in the space around the optical unit 120 opposite to the X-direction drive unit 20 across the optical unit 120. Accordingly, even if the center of the imaging module 100 is matched with or is close to the optical axis of the lens 121, downsizing of the imaging module 100 may be achieved by utilizing the space within the imaging module 100.

Moreover, in the present embodiment, both (or at least one of) the X-direction drive unit 20 and the Y-direction drive unit 30 include the coils 23 and 33 as well as the magnets 21, 22, 31, and 32 opposite to the coils 23 and 33 in the direction intersecting with the imaging area 111*a*. Accordingly, downsizing of the imaging module 100 may be achieved by minimizing the space around the optical unit 120.

Further, in the present embodiment, both (or at least one of) the X-direction drive unit 20 and the Y-direction drive unit 30 include the coils 23 and 33 as well as the two or more magnets 21, 22, 31, and 32 that are opposite to each other across the coils 23 and 33 in the direction intersecting with the imaging area 111*a*. Accordingly, the imaging module 100 may be further downsized.

Further, in the present embodiment, both (or at least one of) the X-direction drive unit 20 and the Y-direction drive unit 30 include the coils 23 and 33, the two or more magnets 21, 22, 31, and 32, and the yokes 24 and 34 with quadrangular-shaped sections that are open on the side of the optical unit 120. Accordingly, the driving force may be strengthened with a simple configuration.

Moreover, in the present embodiment, both (or at least one of) the Y-direction guide axis 71 and the X-direction guide axis 81 are arranged around the image pickup device unit 110. Accordingly, the imaging module 100 may be further downsized by reducing the footprint of the imaging module 100.

Moreover, in the present embodiment, the optical unit 120 and the image pickup device unit 110 are fixed to the image stabilization mechanism 1 from opposite sides in the direction intersecting with the imaging area 111*a*. Accordingly, the assembly of the imaging module 100 becomes easy.

Moreover, in the present embodiment, the X-direction drive unit 20 and the Y-direction drive unit 30 move the image pickup device 111 as an image stabilization object element in the X-direction and the Y-direction. Accordingly, image stabilization may be performed without causing defocusing. Such defocusing is caused, for example, when the optical unit 120 is moved.

In the present embodiment, cases in which the coils 23 and 33 are arranged beside the Y-direction slider 10 and the magnets 21, 22, 31, and 32 are arranged beside the fixed base unit 80 or holder 60 have been described. However, it is still a possible configuration for the coils to be arranged beside the fixed sides and the magnets to be arranged beside the movable sides.

Figure 11:
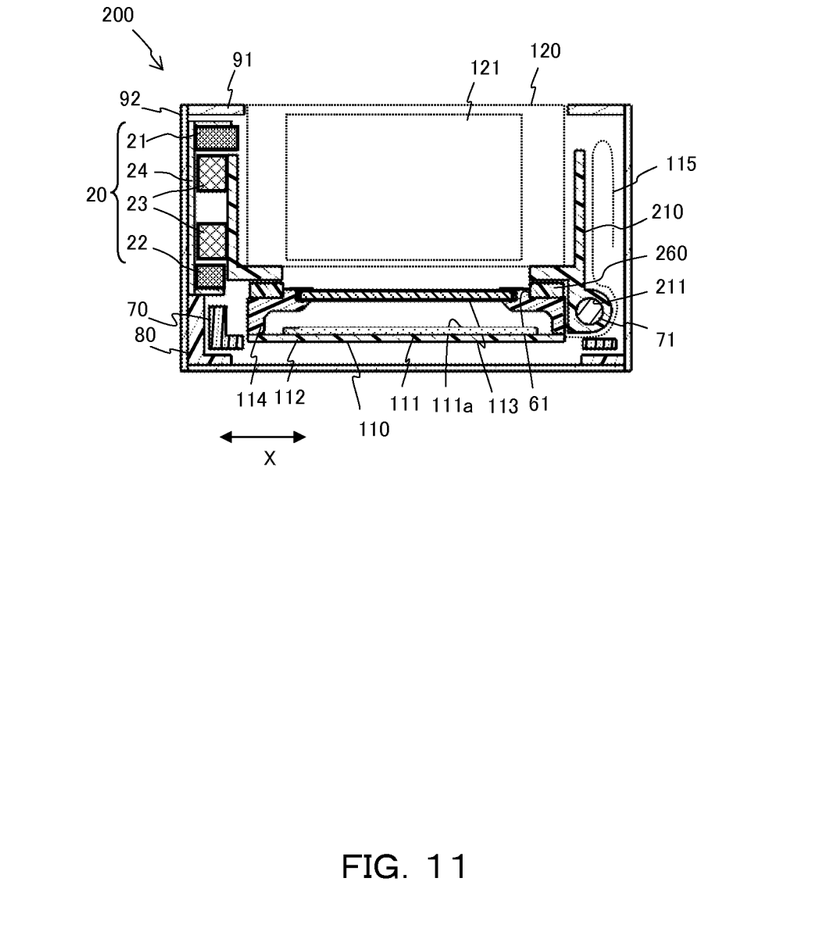
FIG. 11 is a section view of an imaging module according to the first variation of an embodiment of the present invention.

FIG. 11 illustrates a section view of the imaging module 200 (corresponding to a section view of V-V of FIG. 4, as illustrated in FIG. 5) according to the first variation of the present embodiment. In the imaging module 200 according to the present variation, the optical unit 120 is an image stabilization object element instead of the image pickup device 111.

The imaging module 200 according to the present variation is different from the above-described imaging module 100 as the optical unit 120 is fixed to the Y-direction slider 210 and the image pickup device unit 110 is fixed to the holder 260.

Accordingly, the Y-direction slider 210 moves along the Y-direction guide axis 71 of the X-direction slider 70 in the Y-direction in a through-hole 211, and the X-direction slider 70 moves along the X-direction guide axis 81 of the base unit 80 (not illustrated in FIG. 11) in the X-direction. As a result of that, the optical unit 120 moves in the X-direction and the Y-direction.

As described above, in the present variation, the X-direction drive unit 20 and Y-direction drive unit 30 move the optical unit 120 as an image stabilization object element in the X-direction and the Y-direction, which are parallel with the imaging area 111*a* of the image pickup device 111 and which intersect with each other. Accordingly, compared with the case in which the optical unit 120 rotates on, for example, a plane that is parallel with the imaging area 111*a*, defocusing (image blur) can be better prevented in the present variation by preventing instability in a lens 121 due to the vibration of an elastic body even if an autofocus actuator (voice coil motor) (not illustrated) sandwiches the lens 121 with an elastic body.

Figure 12A:
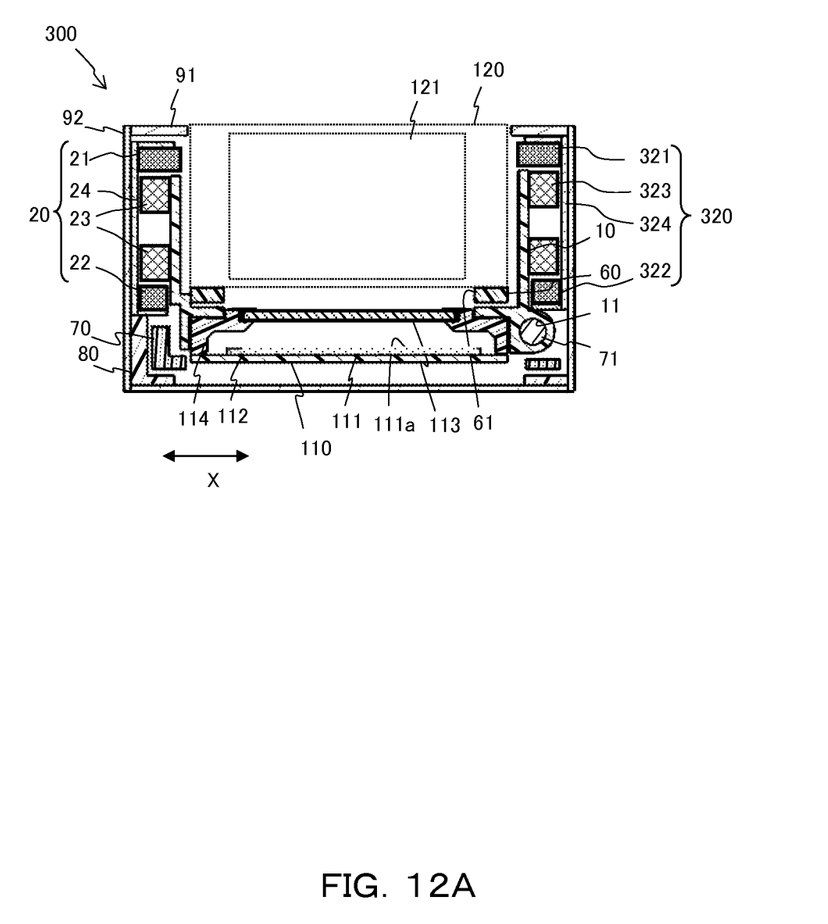
FIG. 12A is a section view (1) of an imaging module according to the second variation of an embodiment of the present invention.
Figure 12B:
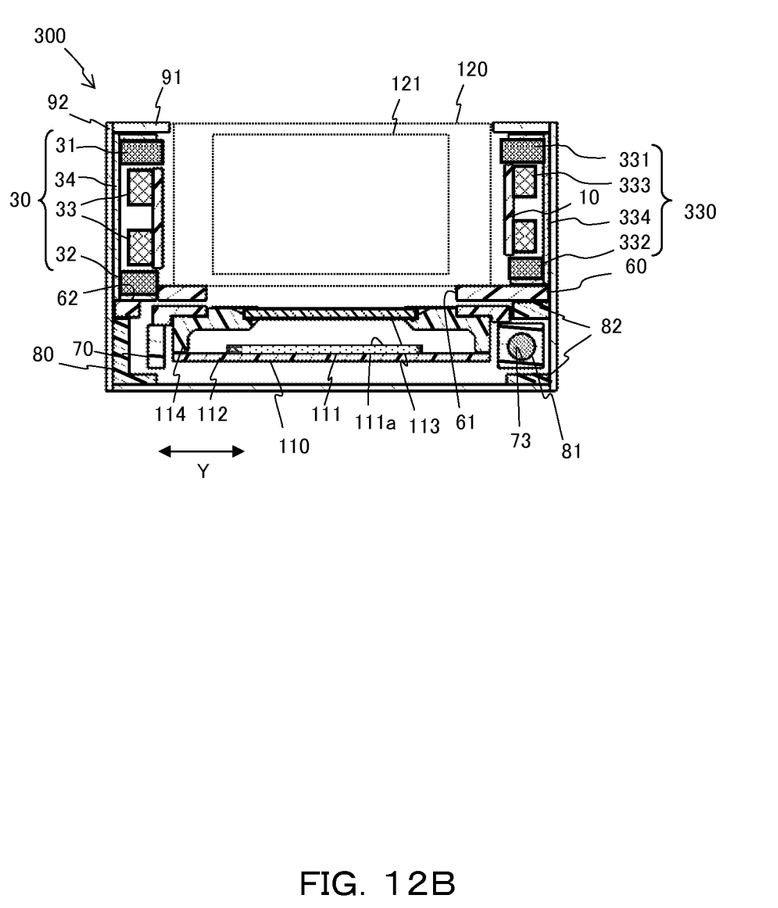
FIG. 12B is a section view (2) of an imaging module according to the second variation of an embodiment of the present invention.

FIGS. 12A and 12B are section views of an imaging module 300 according to the second variation of the present embodiment (corresponding to section views of V-V and VI-VI of FIG. 4, as illustrated in FIGS. 5 and 6). The imaging module 300 according to the present variation is provided with the X-direction drive unit 20 and the Y-direction drive unit 30 respectively arranged at two neighboring sides of the imaging module 300, and an X-direction drive unit 320 and a Y-direction drive unit 330 that are arranged so as to be opposite to the X-direction drive unit 20 and the Y-direction drive unit 30.

The X-direction drive unit 320 and the Y-direction drive unit 330 are provided with magnets 321, 322, 331, and 332, coils 323 and 333, and yokes 324 and 334 in a similar manner as the X-direction drive unit 20 and Y-direction drive unit 30.

In the present variation, it is desirable that the above-described control unit 51, gyroscope 52, and flexible substrate 115 be arranged outside the top cover 91 and the bottom cover 92, or, although not illustrated, it is desirable that the magnets and coils of the X-direction drive unit 320 and the Y-direction drive unit 330 be reduced in size in the dimensions corresponding to the diameter and height of lens and be arranged together with the control unit 51, the gyroscope 52, and the flexible substrate 115.

According to the present variation, the driving force can be enhanced due to the X-direction drive unit 20 and the X-direction drive unit 320, which are opposite to each other, and due to the Y-direction drive unit 30 and the Y-direction drive unit 330, which are also opposite to each other.

Figure 13:
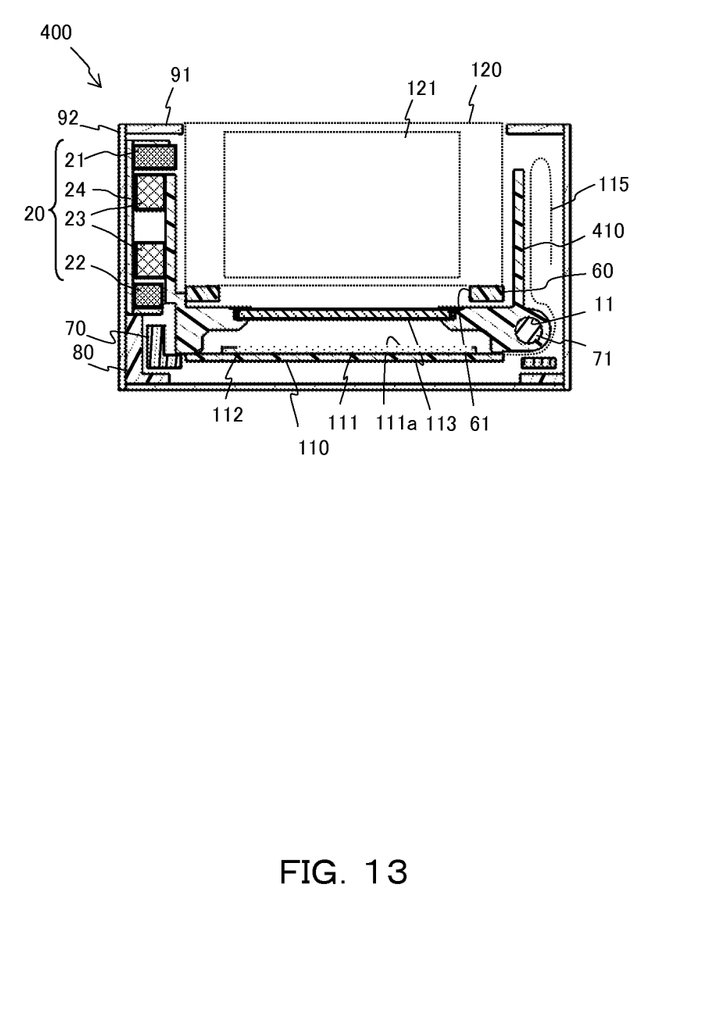
FIG. 13 is a section view of an imaging module according to the third variation of an embodiment of the present invention.

FIG. 13 is a section view of an imaging module 400 according to the third variation of the present embodiment (corresponding to a section view of V-V of FIG. 4, as illustrated in FIG. 5).

The imaging module 400 of the present variation is a combination of the cover glass holder (114) of the above-described embodiment in which a Y-direction slider 410 holds the cover glass 113 as a light transmissive cover, and the Y-direction slider (10) of the above-described embodiment. According to the present variation, simplification of the imaging module 400 can be achieved.

In the accompanying drawings, sections or the like are illustrated with hatching, but the material of each part is not limited by the type of hatching. For example, plastic is used for the Y-direction slider 10, the holder 60, the X-direction slider 70, the base unit 80 or the like; however, different material may be used for those parts. Likewise, metal is used for the Y-direction guide axis 71, the X-direction guide axis 81, the top cover 91, the bottom cover 92 or the like; however, different material may be used for those parts.

What is claimed is:

1. An imaging module comprising:
an image pickup device unit having an image pickup device;

an optical unit to form a subject image on the image pickup device; and an image stabilization mechanism having a first drive unit to move an image stabilization object element that is at least one of the image pickup device and the optical unit in a first direction that is parallel with an imaging area of the image pickup device, and a second drive unit to move the image stabilization object element in a second direction that is parallel with the imaging area and intersects with the first direction, wherein at least one of the first drive unit and the second drive unit includes:

a coil having an opening in an area which is perpendicular to the imaging area of the image pick up device; and two magnets arranged interposing the coil therebetween in a height direction which intersects with the imaging area of the image pick up device.

2. The imaging module according to claim 1, wherein the first drive unit and the second drive unit are respectively arranged around the optical unit and at two neighboring sides of the imaging module.

3. The imaging module according to claim 1, wherein the opening of the coil is rectangular.

4. The imaging module according to claim 1, wherein at least one of the first drive unit and the second drive unit includes a yoke that surrounds the coil and the two magnets and is open on a side of the optical unit.

5. An imaging module comprising:

an image pickup device unit having an image pickup device;

an optical unit to form a subject image on the image pickup device; and an image stabilization mechanism having a first drive unit to move an image stabilization object element that is at least one of the image pickup device and the optical unit in a first direction that is parallel with an imaging area of the image pickup device, and a second drive unit to move the image stabilization object element in a second direction that is parallel with the imaging area and intersects with the first direction;

a camera shaking detection sensor; and a control unit to control the first drive unit and the second drive unit;

wherein the imaging module has a rectangular shape on a plane that is parallel with the imaging area, and the first drive unit and the second drive unit are respectively arranged around the optical unit and at two neighboring sides of the imaging module; and wherein at least one of the camera shaking detection sensor and the control unit is arranged around the optical unit, and is arranged so as to be opposite to the first drive unit or the second drive unit across the optical unit.

6. An imaging module comprising:

an image pickup device unit having an image pickup device;

an optical unit to form a subject image on the image pickup device; and an image stabilization mechanism having a first drive unit to move an image stabilization object element that is at least one of the image pickup device and the optical unit in a first direction that is parallel with an imaging area of the image pickup device, and a second drive unit to move the image stabilization object element in a second direction that is parallel with the imaging area and intersects with the first direction;

a camera shaking detection sensor; and a control unit to control the first drive unit and the second drive unit;

wherein the imaging module has a rectangular shape on a plane that is parallel with the imaging area, and the first drive unit and the second drive unit are respectively arranged around the optical unit and at two neighboring sides of the imaging module; and wherein:

the image pickup device has a flexible substrate;

the camera shaking detection sensor and the control unit are arranged around the optical unit and are arranged so as to be opposite to either the first drive unit or the second drive unit across the optical unit, and the flexible substrate is arranged around the optical unit and is arranged so as to be opposite across the optical unit to a left one of the first drive unit and the second drive unit.

* * * * *